FIG. 10
FIG. 12
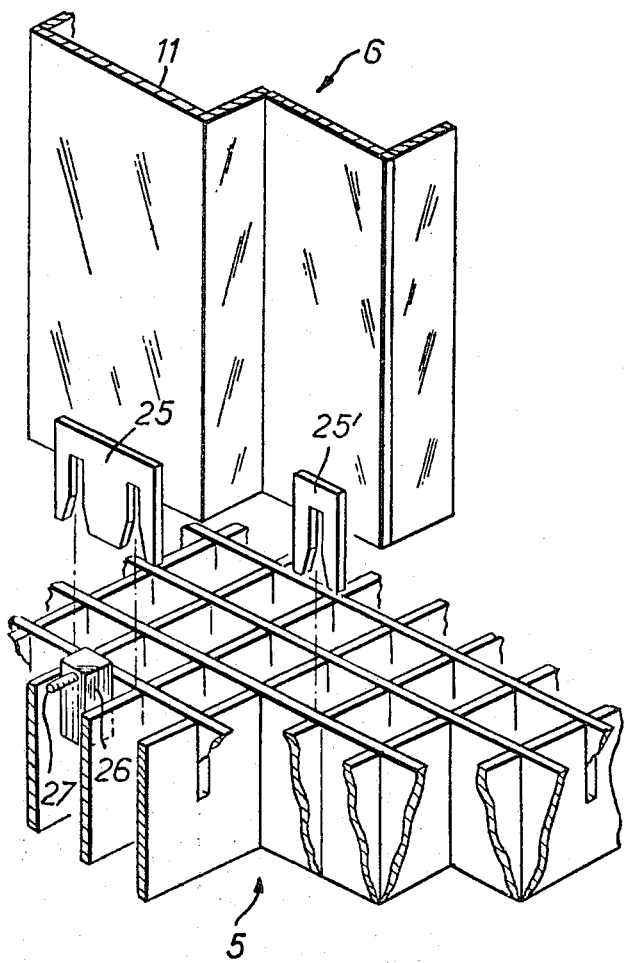
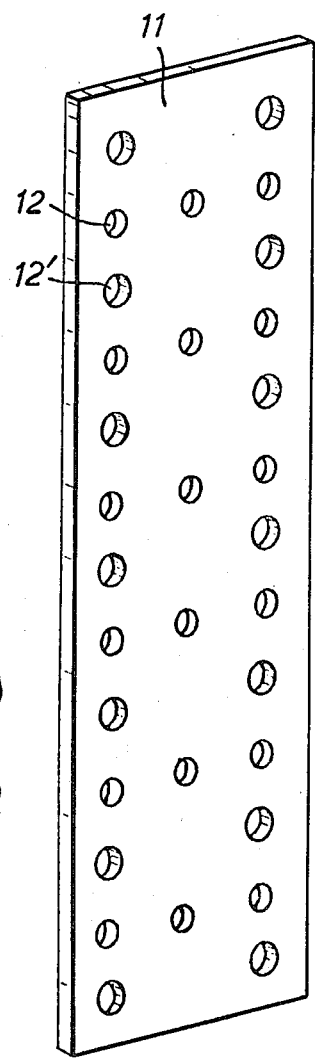

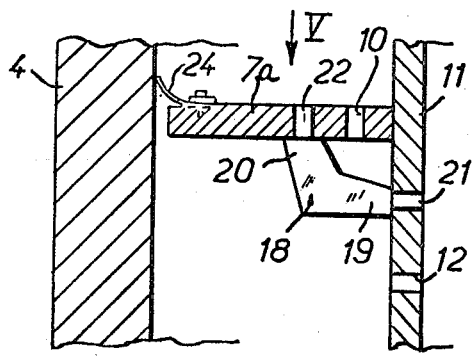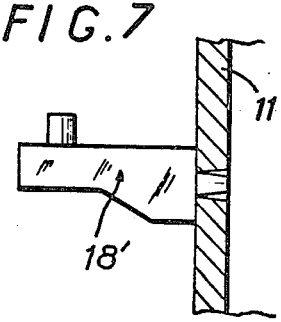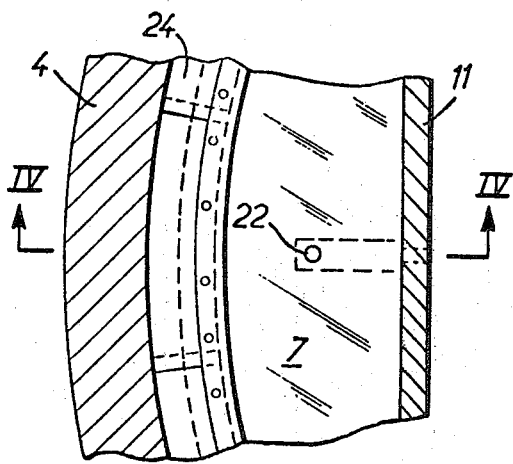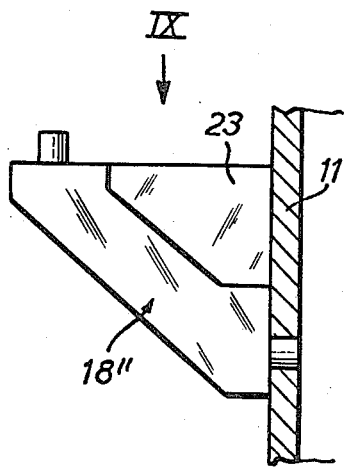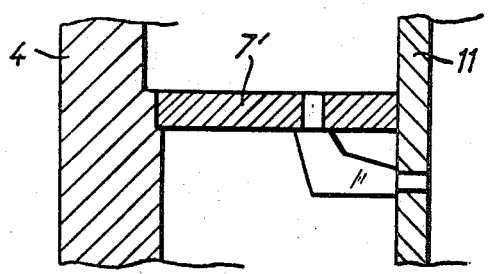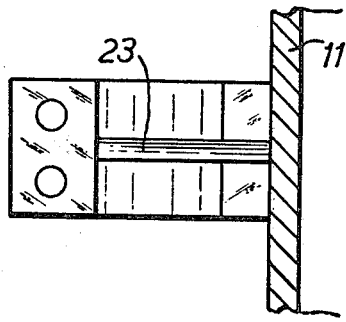

United States Patent Office 3,823,066
Patented July 9, 1974

3,823,066
JACKETING FOR AN ASSEMBLY OF NUCLEAR
REACTOR FUEL ELEMENTS
Paul Thomè, St. Cloud, France, assignor to Babcock-Atlantique, S.A., Paris, France
Filed Apr. 27, 1972, Ser. No. 248,074
Claims priority, application France, Apr. 29, 1971, 7115325
Int. Cl. G21c 3/20
U.S. Cl. 176—66                                   5 Claims

ABSTRACT OF THE DISCLOSURE

Electron beam welding is used to join the lateral plates that surround the fuel elements in a nuclear reactor core without deformation through a proper welding sequence. Baffle-plates or partitions, moreover, also are stud-welded to the lateral plates without deformation through the electron beam process. The upper circumferential part of the completely assembled structure ultimately is welded to the reactor core barrel. Screwjacks also are provided to quickly position the structure over a lower grid. This technique eliminates the usual threaded fasteners and the need for accurate lower core barrel machining operations.

BACKGROUND OF THE INVENTION

Field of the Invention

The present invention relates to nuclear installations which have, inside a nuclear reactor vessel, a cylindrical support skirt that has a vertical axis and which surrounds vertically elongated prismatic fuel elements that are held against one another. The assembly of these fuel elements is defined by a crenulated outer vertical surface that has a jacket of corresponding shape.

DESCRIPTION OF THE PRIOR ART

From an assembly and fabrication viewpoint, the structures which serve to position, maintain and guide the fuel components and control rods are very delicate and are made with high precision. It is indispensable, for many reasons that are imposed, for example, by thermal, neutron, strength of materials, resistance to vibration, and like effects to position these elements exactly in space and in time. The accuracy is achieved through strict manufacturing specifications and assembly tolerances.

"Pins" at the two extremities of each of the fuel elements are received on two very rigid supporting grids that hold the elements in the core of the reactor. These removable and interchangeable fuel elements are arranged side by side, and are encircled by lateral jacketing, moreover, which requires a degree of precision manufacture that is comparable to reactor core requirements.

In present-day structures, this jacketing is fixed rigidly on a support skirt by means of a series of partitions that are bolted to the skirt. The partitions, in turn are bolted to the plates that constitute the lateral jackeing. The supporting grids that receive the ends of the fuel elements also are connected to this support skirt and, at one end, also are connected to the lateral jacketing. Thus, the support skirt functions as a reference for the entire assembly. These partitions require a number of machining operations as well as a slow detailed assembly in which the partitions are bolted to the lateral plates and the skirt. The skirt, which serves as a reference not only must be a precision piece, but also in view of its dimensions, requires costly machining. The time involved in machining and for the final fitting and assembly operation also are extremely burdensome, as well as requiring the use of thousands of attachment bolts. These bolts, moreover, are scarcely satisfactory because of the combined risk of a poor stop nut and the effect of vibrations.

SUMMARY OF THE INVENTION

It is the object of the present invention to reduce the number of manufacturing procedures and the time consumed in fabricating and assembling reactor core jackets, to increase core jacket reliability by eliminating bolted assemblies and to facilitate core jacket adaptability to mechanical and geometrical requirements.

With this in mind, the invention is directed to a reactor core jacket that forms a self-supporting unit which is independent of the support skirt. A jacket illustrative of the invention is characterized by a vertical enclosure that is open at the top an bottom. The enclosure, moreover, is formed by vertical plates that are welded to one another in a profile that conforms to the outer surface of the reactor core.

Preferably, the outer surface of the enclosure is stiffened with horizontal partitions which have an outer border that matches the inner surface of the support skirt. A partition of this sort is provided with an outer border that has a flexible lining which is adapted to establish a leakproof, or almost leakproof contact with the inner surface of the support skirt.

According to one embodiment of the invention, these partitions are supported by gussets or brackets that are connected to the jacketing. A gusset of this sort has a cylindrical protrusion or stud that is adapted to enter a corresponding hole in the jacketing, the connection between the gusset and the jacketing, being completed by electron beam welding through a circular path that is formed at the face of the contact between the hole and the pin.

Preferably, the gusset is connected to the partition which it supports in similar fashion, through an electron beam weld between a bored face and a cylindrical stud or boss. Each of the vertical plates that comprise the jacketing is disposed in edgewise contact with the main face of an adjacent plate, the the plates being joined together by electron beam welding in the contact planes thus defined. Horizontal partitions can be welded to the jacketing, moreover, in order to fix the jacketing position relative to the skirt. For example, the upper partition can be treated in this manner. The bottom attachment also can be accomplished by providing the jacketing with fork-shaped elements that are adapted to straddle the beams of the lower reactor support grid, and wedging the jacketing in position at the bottom level by any suitable means. Illustratively, screw jacks, connected to the grid can be used to apply horizontal restraining forces on the jacketing, and to provide position adjustment for the jacketing.

The objects, characteristics and advantages of the invention will appear more clearly in the description to be given below, relating to a method of embodiment selected by way of example and represented to the attached drawings.

BRIEF DESCRIPTION OF THE DRAWING

FIG. 4 is a view in vertical section of a means for jacketing;

FIG. 4 is a view in vertical section of a means for jacketing attachment;

FIG. 5 is a plan view of the jacketing attachment means, looking in the direction of the arrow V in FIG. 4;

FIG. 6 shows in vertical section, an upper partition for the jacketing;

FIGS. 7 and 8 are further embodiments of attachment means for connecting the partitions to the jacketing;

FIG. 9 is a plan view of the means shown in FIG. 8, looking in the direction of the arrow IX;

FIG. 10 is a partial exploded perspective view that shows the jacketing opposite the lower grid of the reactor;

FIG. 12 is a perspective view of one of the vertical blocks that constitutes the jacketing.

DESCRIPTION OF THE PREFERRED EMBODIMENTS

Figure 1:
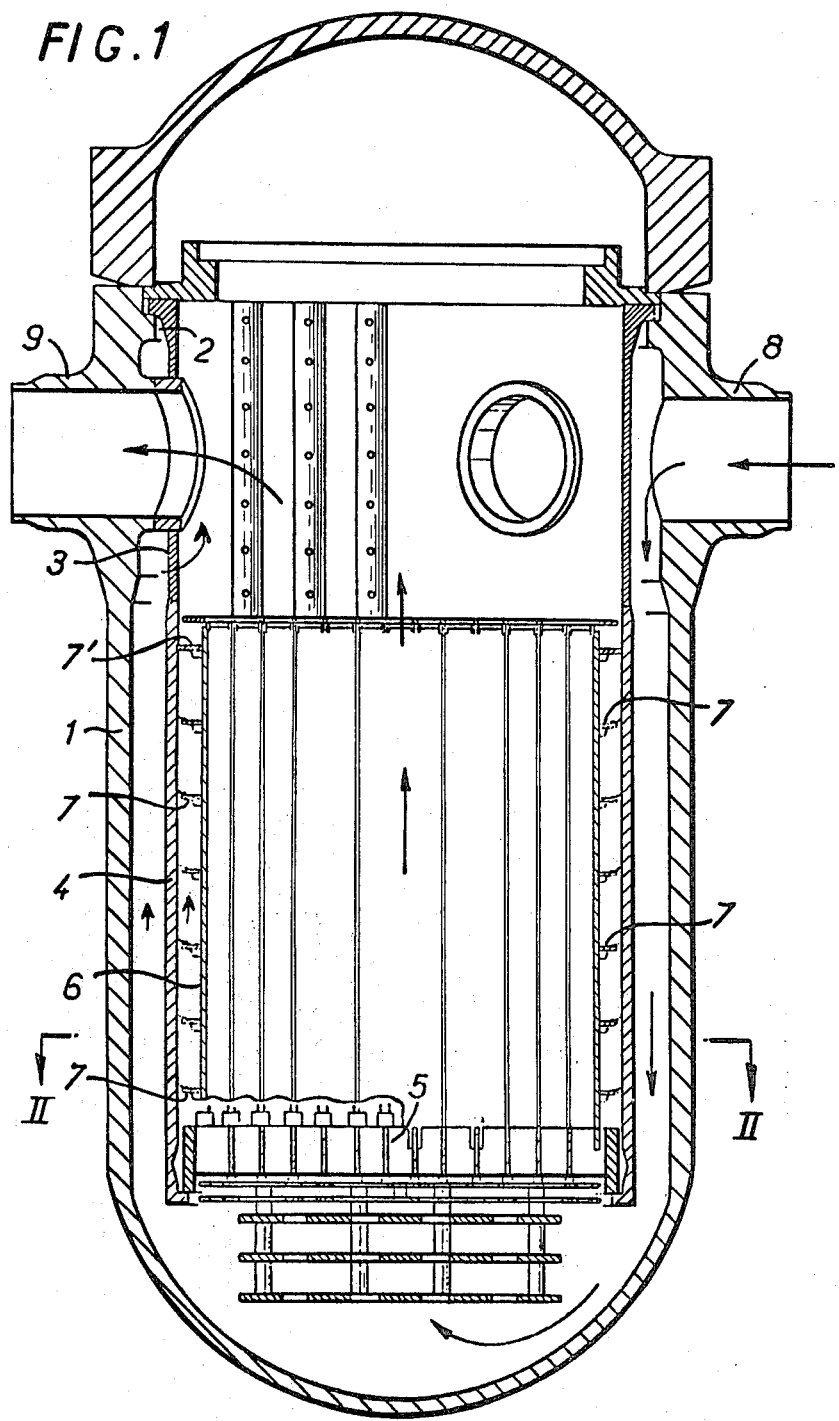
FIG. 1. represents, in vertical section, a nuclear core assembly.

In the drawings, a nuclear installation consists of a reactor vessel 1 composed of a cylindrical envelope with a longitudinal axis and an hemispherical bottom and top. The vessel 1 has, at the top, an annular flange 2 that protrudes from the inner face of the vessel. A hollow cylindrical distribution hoop 3 depends from the flange 2. A hollow cylindrical skirt 4, moreover, is welded to the lowermost edge of the hoop 3.

Inside the skirt 4 a group of vertically elongated fuel elements (not shown) rest on a grid 5. The fuel elements are square or rectangular in transverse section, and a jacketing 6, surrounds the outer longitudinal surface of the group of fuel elements. This jacketing 6 conforms closely to the shape of the assembled group of fuel elements and therefore has, in cross section (FIG. 2) a crenulated profile or contour. This jacketing is composed of vertical plates that are connected border-to-border. The jacketing is further equipped, on its outer face, with horizontal partitions 7 whose outer borders are shaped to match the inner face of the skirt and therefore have a circular perimeter in the example of the invention under consideration. The reactor vessel 1 is equipped on the top with intake nozzles 8 and outlet nozzles 9, in order to promote the circulation of a cooling fluid through the reactor core. The outlet nozzles 9 protrude through the wall of the distribution hoop 3 and are joined to the latter in a leak-proof fashion. Typically, a coolant, of which "light" water is suitable, is admitted through the input nozzles 8 in order to circulate within the reactor generally according to the route marked with arrows. Thus, the water flows into the annular space between the vessel 1 and the skirt 4 and in a vertical direction down into the bottom of the reactor in order to flow up through the core of the reactor to the distribution hoop 3. From the interior of the hoop 3, the water flows through the outlet nozzles 9.

A part of the upwardly flowing coolant rises through an annular space between the skirt 4 and the jacketing 6. This portion of the coolant flows through partitions, or baffles, that are disposed across this annular space transverse to the direction of coolant circulation.

Figure 3:
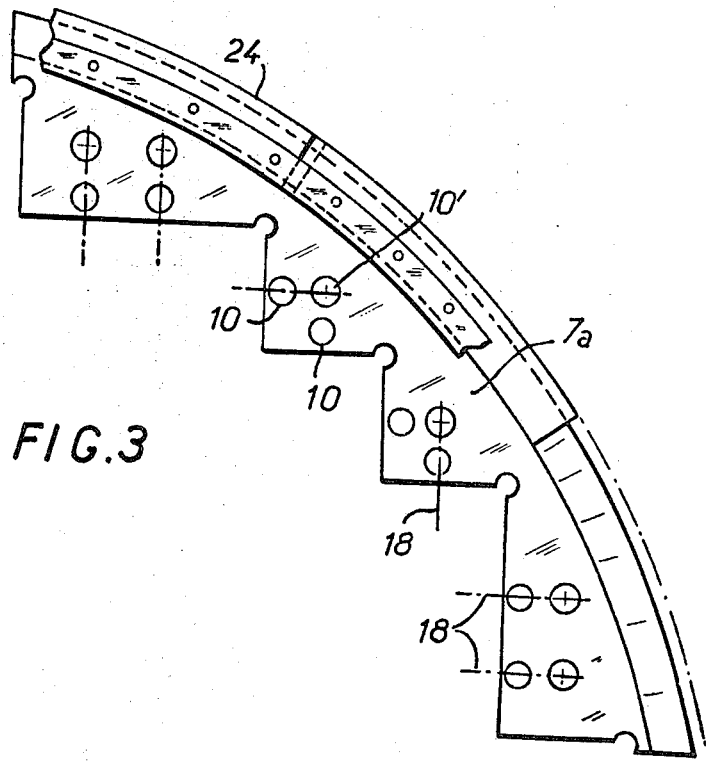
FIG. 3 shows, in plan view on an enlarged scale, a horizontal partition element forming part of the reactor jacketing.

These partitions fulfill several functions; for example, they serve to stiffen the jacketing on its outer face and they retard the flow of coolant between the jacketing and the skirt. For this latter purpose, the partitions are equipped with suitably proportional passage holes 10 (FIG. 3). Plates 11 (FIG. 12) which form the jacketing proper, also have holes 12 to insure fluid pressure equalization on both sides of the jacketing.

As mentioned above, known methods of jacketing construction include bolting the partitions to the skirt, then bolting the plates to the partitions. The serious drawbacks in this method of construction also have been considered above. As shown in the attached drawing, the jacketing components are fabricated independently of the skirt to final dimensions with all of the necessary precision.

Figure 13:
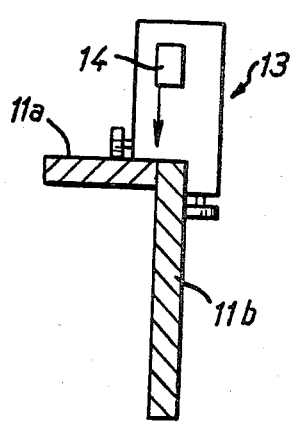
FIGS. 13 and 14 represent stages in the fabrication of the jacketing.
Figure 14:
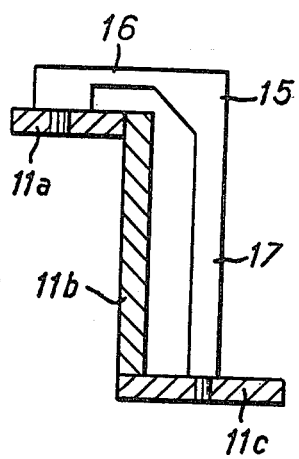

A typically convenient method of fabrication in accordance with the terms of the invention consists, first, in assembling the vertical plates 11 of the jacketing, border-to-border by electron beam welding as shown in FIG. 10. FIGS. 13 and 14, for example, illustrate two phases of this construction method. In FIG. 13, a plate 11a rests with its edge on a main face of adjacent plate 11b disposed at right angles to plate 11a.

An apparatus 13, of known type, with vacuum chamber and electron gun 14, is adapted to roll longitudinally over the two plates, and to sweep, with electron beams, the contact interface of these two plates, which has the effect of welding the plates to one another without distortion. Shrinkage resulting from this welding technique also is relatively small and quantitatively predictable within the tolerances that are imposed on the jacketing.

FIG. 14 illustrates the next step in the method which involves a similar welding operation that is to be carried out at the interface between an edge of the plate 11b and a main face of an adjacent plate 11c. This welding operation is preceded by temporarily positioning the plate 11c to the plate 11a. Typically, the arm 16 of an L-shaped jig 15 is secured to the plate 11a. Subsequently, the arm 17 of this same jig is fixed to the plate 11c. The precision of the jig 15 insures a corresponding precision in the relative positions of the two plates 11a and 11c. To make this assembly possible, a slight play compatible with a satisfactory electron beam weld, is provided at the interface between the plates 11b and 11c. To minimize the effects of welding shrinkage on the jacketing as a whole, moreover, the successive welding interfaces are disposed at right angles to one another.

Figure 2:
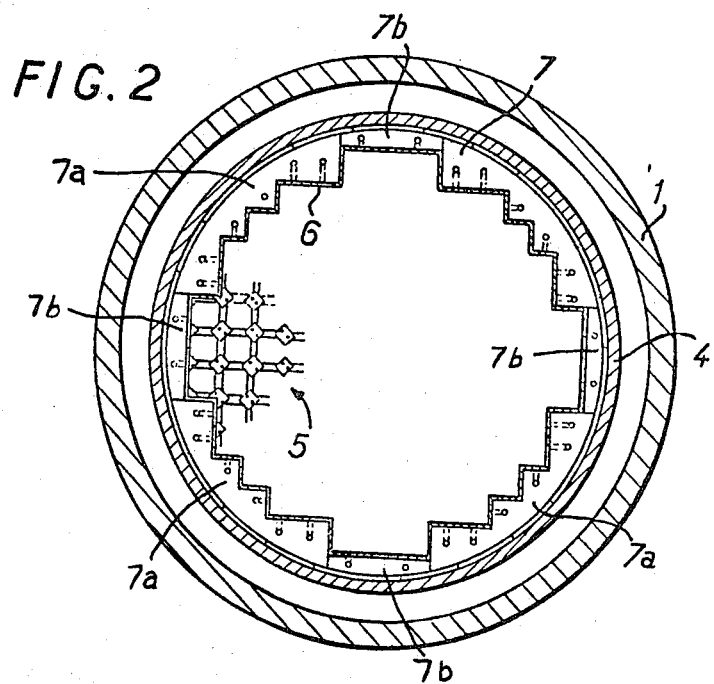
FIG. 2 is a section in plan view taken along line II—II of FIG. 1 and looking in the direction of the arrows.

As shown in FIGS. 2 and 3, each of the horizontal partitions 7 is composed of several elements which comprise, in the illustrative example, four sectors 7a which over respective arcs of a circle that each are slightly less than 90°, and four sectors 7b which are alternatively interposed between the adjacent sectors 7a. As shown in FIG. 2, the sectors 7b each have straight inner borders and circular outer borders. The sectors 7a also have respective circular outer borders. The inner borders of the sectors 7a, however, are crenulated to adapt to the shape of the jacketing. Each of the partition elements rest on brackets 18 (FIG. 4) which are fixed to the jacketing. The brackets 18 which support the sectors 7a, moreover, are shown in FIG. 3 by their axes which are indicated with broken lines.

A bracket 18 has an elbow shape, with two arms 20 and 19, each terminating respectively in a horizontal protrusion or stud 21 and a vertical boss or stud 22. The horizontal stud 21 is cylindrical in shape and is received in an aperture 12' of corresponding shape (FIG. 12) that is formed in the jacketing. The bracket 18 is welded to the jacketing through a circular sweep of the electron beam on the interface formed between the two components. The stud 22 is joined to the partition 7 through a similar electron beam weld at the vertical stud 22. The sectors 7a (FIG. 3) therefore are provided with two kinds of holes, the holes 10 to promote coolant circulation and holes 10', which receive the studs 22 (not shown in FIG. 3).

FIGS. 7 and 8 show front elevation views of two further types of bracket 18' and 18'', respectively, which serve the same purpose as the bracket 18 that is described above. The bracket 18'' that is shown in front elevation in FIG. 8 also is shown in plan view in FIG. 9. The bracket 18'' is particularly useful in situations that require extreme rigidity. As shown, the body of the bracket 18'' is combined with a thin vertical stiffening web 23.

Turning once more to FIG. 1, with the exception of an upper partition 7' a circular outer border of each of the other horizontal partitions 7 is lined with a series of flexible blades 24 (FIGS. 4 and 5). Each of these blades forms an arc of a circle, and each is disposed to overlap one another. As shown in FIG. 4, for example, these blades have the flexibility needed to establish an elastic contact with the inner surface of the skirt 4, and sound joint thus can be provided between inner surface of the skirt and the outer border of the partition 7.

The bottom of the jacketing 6 has, as shown in FIG. 10, forks 25 and 25' secured to the outer surface thereof. The forks 25 and 25' are equipped with downwardly oriented vertical arms that straddle corresponding beams which comprise the lower grid 5. The grid, in turn serves as a support for the jacketing 6.

Figure 11:
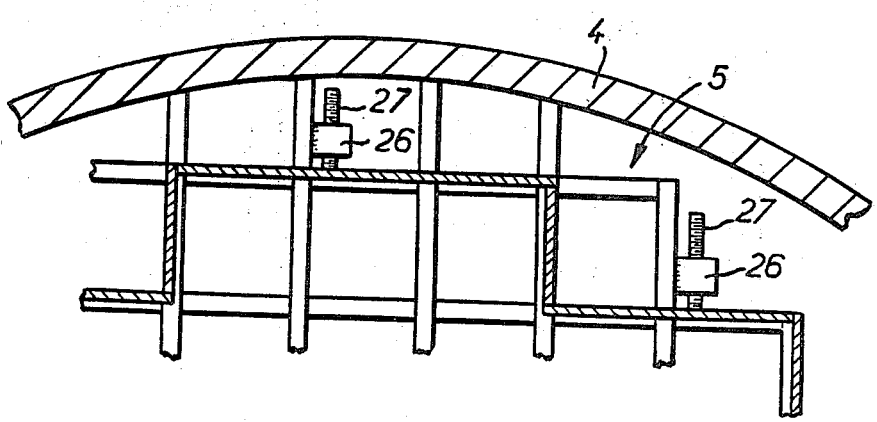
FIG. 11 is a plan view in full section of the jacketing.

On the lateral faces of some of the beams in the grid 5, blocks 26 (FIGS. 10 and 11) are secured. These blocks, which protrude beyond the upper edge of the beams are disposed external to the jacketing 6 and are equipped with threaded adjustment members or screw jacks 27. Preferably, the screw jacks 27 can be manipulated to apply adjustment forces to the jacketing 6 or to adjust the position of the jacketing.

Thus, in accordance with the invention it is possible to fabricate easily and in any convenient place, e.g., some place outside of the reactor skirt 4 (FIG. 1), a jacketing 6 that is finished to final dimensions within very narrow tolerances. Connecting the vertical plates together, moreover, will only produce a predictable linear shrinkage that is without distortion. Further in this regard the horizontal partitions are secured to the vertical plates through studs or "rivets" that are electron beam welded, thereby contributing only a negligible deformation.

The flexible members or blades 24 (FIG. 4) establish a substantial tolerance between the overall dimensions of the jacketing and the inner dimensions of the skirt 4. This broad tolerance provision facilitates the installation of the skirt through a vertical movement, while establishing a leakproof seal between the jacketing and the skirt. This seal prevents the coolant from by-passing the reactor core.

The installation of the jacketing on the lower support grid 5 (FIG. 10) usually is followed by an adjustment in position. This adjustment is achieved through a manipulation of the screw jacks 27, and welding the upper partition 7' (FIG. 6) to the skirt 4. This welding preferably is accomplished through a circular sweep by the electron beam in the interface that is formed between the skirt 4 and the perimeter of the partition 7'.

The distribution hoop 3 can be installed after the jacketing 6 is finally positioned. This feature of the invention facilitates the assembly of the reactor system.

It is clear from the foregoing specification that jacketing construction embodying principles of the invention do not require a bolted assembly. Skirt manufacturing tolerances, moreover, are relaxed to less than those required in prior construction.

What is claimed is:

1. Jacketing for an assembly of nuclear reactor fuel elements disposed within a reactor skirt, comprising a plurality of metal plates each connected border-to-border to match the contour of the fuel element assembly, partitions connected to said plates and generally perpendicular thereto, said partitions having perimeters that conform to the inner face of the reactor skirt, said connected plates forming an open-ended enclosure for the fuel elements, a plurality of brackets each electron beam welded to a respective one of said plates, and generally cylindrical studs each formed on a respective one of said brackets, said plates each having a respective hole for receiving an associated one of said studs therein.

2. Jacketing according to Claim 1 wherein said partitions further comprise a plurality of peripherally disposed flexible members adapted to establish a seal with the inner face of the reactor skirt to retard fluid circulation between the reactor skirt and said partitions.

3. Jacketing for an assembly of nuclear reactor fuel elements disposed within a reactor skirt, comprising a plurality of metal plates each connected border-to-border to match the contour of the fuel element assembly, partitions connected to said plates and generally perpendicular thereto, said partitions having perimeters that conform to the inner face of the reactor skirt, said connected plates forming an open-ended enclosure for the fuel elements and having on one end thereof a plurality of forks depending therefrom, and a plurality of beams forming a grid adjacent to said enclosure end, at least some of said beams being stradded by said depending forks.

4. Jacketing according to Claim 3, wherein said grid further comprises adjustable means for selectively applying a force to the jacket.

5. Jacketing according to Claim 3 wherein the other end of said open-ended enclosure formed by said plates further comprises an electron beam weld to the skirt.

References Cited

UNITED STATES PATENTS

| | | | |
|---|---|---|---|
| 2,990,349 | 6/1961 | Roman | 176—61 X |
| 3,607,637 | 9/1971 | Marshall | 176—61 |
| 3,159,550 | 12/1964 | Laming | 176—61 X |
| 3,623,948 | 11/1971 | Dotsum | 176—61 |
| 3,378,456 | 4/1968 | Roberts | 176—61 |

OTHER REFERENCES

HW-79143 (TID-4500, 23d edition), Electron Beam Welding of Nuclear Fuel Cladding Components by R. F. Klein, Harford Laboratories, October 1963, pp. 1, 2.

REUBEN EPSTEIN, Primary Examiner

U.S. Cl. X.R.

171—50, 87